US012573567B2

(12) United States Patent
Yang

(10) Patent No.: US 12,573,567 B2
(45) Date of Patent: Mar. 10, 2026

(54) SEMICONDUCTOR-BASED DC TRANSFER SWITCH

(71) Applicant: Siemens Industry, Inc., Alpharetta, GA (US)

(72) Inventor: Guang Yang, Johns Creek, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 39 days.

(21) Appl. No.: 18/474,366

(22) Filed: Sep. 26, 2023

(65) Prior Publication Data

US 2025/0105660 A1 Mar. 27, 2025

(51) Int. Cl.
*H01H 9/26* (2006.01)
*H01H 9/54* (2006.01)

(52) U.S. Cl.
CPC .............. *H01H 9/26* (2013.01); *H01H 9/547* (2013.01)

(58) Field of Classification Search
CPC ........ H01H 9/26; H01H 9/547; H01H 33/596; H01H 9/548; H01H 2009/543; H01H 2009/544; H01H 2300/018
See application file for complete search history.

(56) References Cited

U.S. PATENT DOCUMENTS

| | | | | |
|---|---|---|---|---|
| 8,222,548 | B2 | 7/2012 | Espeut, Jr. | |
| 8,723,361 | B2 | 5/2014 | Flegel | |
| 9,583,942 | B2 | 2/2017 | Czarnecki | |
| 11,398,724 | B1 | 7/2022 | Yang | |
| 11,509,128 | B2 | 11/2022 | Song et al. | |
| 2019/0006838 | A1 | 1/2019 | Tang et al. | |
| 2019/0304713 | A1* | 10/2019 | Chen | H01H 9/26 |
| 2021/0066959 | A1* | 3/2021 | Chen et al. | H02J 9/06 |
| 2025/0037954 | A1* | 1/2025 | Han | H01H 71/04 |

FOREIGN PATENT DOCUMENTS

CN 201084572 Y 7/2008

OTHER PUBLICATIONS

Siemens, "Generator Ready Load Center" 2009. pp. 1-8. https://www.sea.siemens.com/generators.

* cited by examiner

*Primary Examiner* — Daniel Cavallari

(57) ABSTRACT

Systems for method for a semiconductor-based DC transfer switch. The semiconductor-based DC transfer switch uses two individual circuit breakers that are mechanically interlocked in such a way that only one of the two circuit breakers can be closed at any time. An actuator, such as a motor, operates mechanical arms that interact with the handles of the circuit breakers. At least one of the circuit breakers is a semiconductor-based DC circuit breaker.

7 Claims, 14 Drawing Sheets

SEMICONDUCTOR-BASED DC TRANSFER SWITCH

FIELD

This disclosure relates to transfer switches.

BACKGROUND

Several recent developments have brought direct current (DC) power systems back into competition with alternating current (AC) power systems. DC power systems have inherent advantages such as less power loss during transmission and no energy wasted on reactive components. However, DC power systems have been limited in power distribution applications because of limitations, such as difficulties in stepping up or stepping down voltages and difficulties in designing switching/protecting gears. Developments in power electronics have made both DC voltage transforming and DC protection/switching possible at high voltage levels. As a result, many concepts plan to use DC power for industrial and residential applications. In these applications, DC power may be provided by different sources, such as batteries, solar panels, electric vehicles, sub-division level DC power from utilities, etc. To provide proper safety and functions, many applications allow only one power source at any given time. Therefore, transfer switches are needed to make selections between DC sources. If both AC power and DC power are used as power sources, transfer switches are also needed to select between the AC and DC power sources. Also, in some applications, such as DC electric vehicle charging and discharging, bidirectional DC current needs to be provided. Transfer switches may provide solutions to allow control of current direction.

SUMMARY

By way of introduction, the preferred embodiments described below include systems and methods for semiconductor-based solutions for transfer switches with DC legs.

In an embodiment, a transfer switch is provided that operates between a first power source and a second power source, the transfer switch comprising: a semiconductor-based DC circuit breaker connected to the first power source and a load, the semiconductor-based DC circuit breaker including a DC circuit breaker handle that opens and closes the semiconductor-based DC circuit breaker; a second circuit breaker connected to the second power source and the load, the second circuit breaker including a circuit breaker handle that opens and closes the second circuit breaker; and an actuator configured to operate a DC circuit breaker mechanical arm and a second circuit breaker mechanical arm that interact with the DC circuit breaker handle and the circuit breaker handle for the second circuit breaker, respectively, such that the semiconductor-based DC circuit breaker and the second circuit breaker are mechanically interlocked, wherein the mechanical interlocking of the semiconductor-based DC circuit breaker and the second circuit breaker is configured, such that only one circuit breaker of the semiconductor-based DC circuit breaker and the second circuit breaker is closed at any time.

In an embodiment, a transfer switch is provided for bi-directional DC current flow, the transfer switch comprising: a first semiconductor-based DC circuit breaker configured to allow power flow from an input power source to an output power load, the first semiconductor-based DC circuit breaker including a first handle configured to open and close the first semiconductor-based DC circuit breaker; a second semiconductor-based DC circuit breaker configured to allow power flow from the output power load to the input power source, the second semiconductor-based DC circuit breaker including a second handle configured to open and close the second semiconductor-based DC circuit breaker; and an actuator configured to operate mechanical arms that interact with the first handle and the second handle such that the first semiconductor-based DC circuit breaker and the second semiconductor-based DC circuit breaker are mechanically interlocked, the mechanical interlocking of the first semiconductor-based DC circuit breaker and the second semiconductor-based DC circuit breaker being configured such that only one semiconductor-based DC circuit breaker of the first semiconductor-based DC circuit breaker and the second semiconductor-based DC circuit breaker is closed at any time.

In an embodiment, a method is provided for switching between a first power source and a DC power source using a transfer switch, the transfer switch comprising a semiconductor-based DC circuit breaker connected to the DC power source, a second circuit breaker connected to the second power source, and an actuator connected to a DC circuit breaker mechanical arm and a second circuit breaker mechanical arm, the second circuit breaker mechanical arm and the DC circuit breaker mechanical arm being configured to interact with a circuit breaker handle for the second circuit breaker and a DC circuit breaker handle, respectively, such that the second circuit breaker and the semiconductor-based DC circuit breaker are mechanically interlocked, the mechanical interlocking between the second circuit breaker and the semiconductor-based DC circuit breaker being configured such that only one circuit breaker of the second circuit breaker and the semiconductor-based DC circuit breaker is closed at any time, the method comprising: providing the transfer switch with the second circuit breaker closed and the semiconductor-based DC circuit breaker open; opening the second circuit breaker, opening the second circuit breaker comprising rotating the actuator in a first rotational direction, such that: the second circuit breaker mechanical arm moves the circuit breaker handle of the second circuit breaker from an ON position to past an OFF overcenter position; and the DC circuit breaker mechanical arm moves the DC circuit breaker handle of the semiconductor-based DC circuit breaker below an ON overcenter position, which leaves open the semiconductor-based DC circuit breaker; and closing the semiconductor-based DC circuit breaker comprising further rotating the actuator in the first rotational direction, such that the DC circuit breaker mechanical arm moves the DC circuit breaker handle to an ON position.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

DETAILED DESCRIPTION

Figure 1:
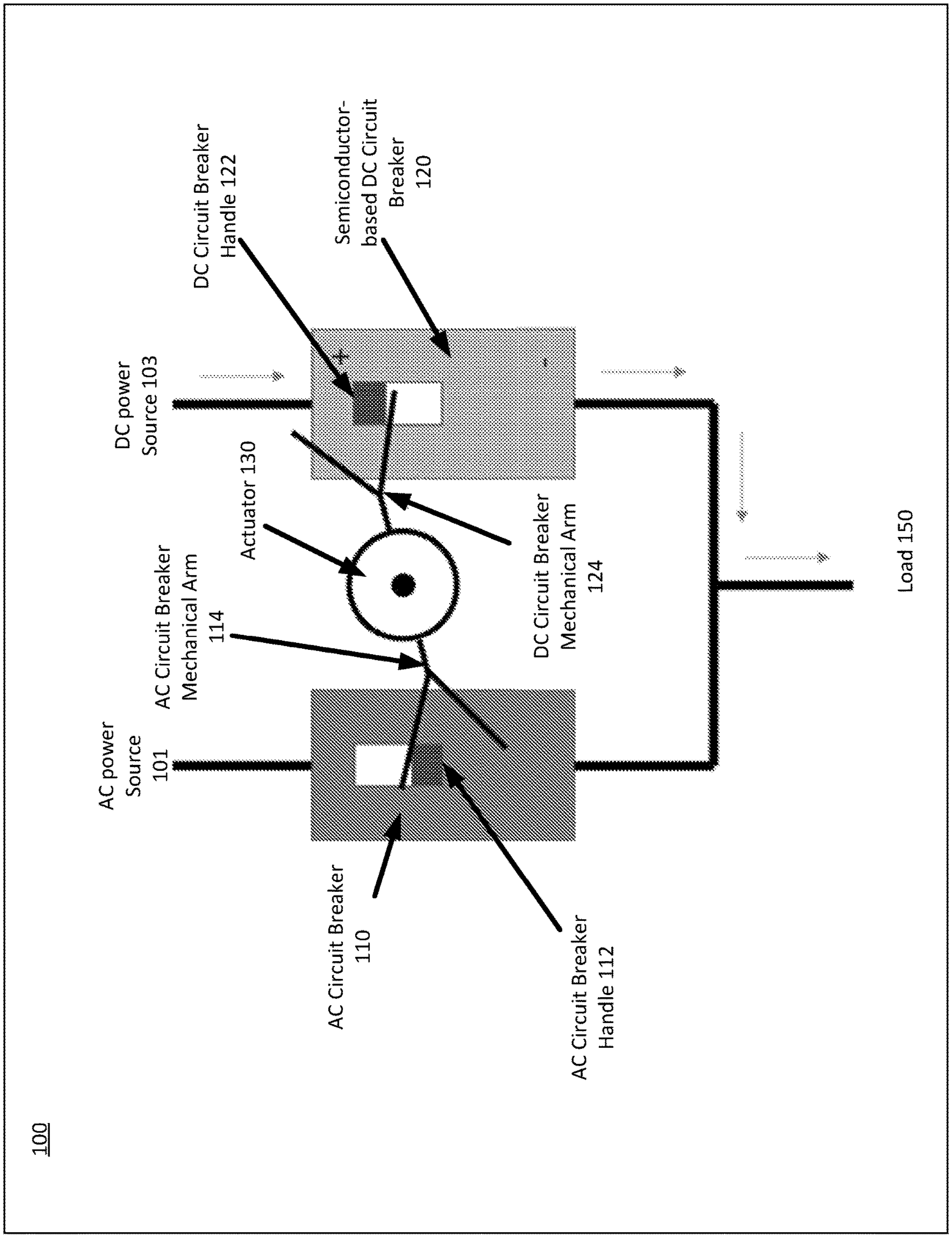
FIG. 1 depicts an example semiconductor-based DC transfer switch according to an embodiment.

To facilitate an understanding of embodiments, principles, and features of the present invention, they are explained hereinafter with reference to implementation in illustrative embodiments. In particular, they are described in the context of a transfer switch with at least one solid-state DC circuit breaker. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the transfer switch and the solid-state DC circuit breaker according to the present disclosure are described below with reference to FIGS. 1-14 herein. Like reference numerals used in the drawings identify similar or identical elements throughout the several views. The drawings are not necessarily drawn to scale.

The embodiments described herein provide systems and methods for a semiconductor-based DC transfer switch 100. The semiconductor-based DC transfer switch 100 uses two individual circuit breakers that are mechanically interlocked in such a way that only one of the two circuit breakers can be closed at any time. One advantage of using circuit breakers in a transfer switch is that circuit breakers provide the functions of both circuit protection and power disconnection, and hence reduce the number of components and the complexity of the system. An actuator 130, such as a motor, operates mechanical arms 114, 124 that interact with the handles of the circuit breakers 110, 120. The actuator 130 may be operated both manually and automatically. At least one of the circuit breakers is a semiconductor-based DC circuit breaker.

Traditional DC mechanical circuit breakers occupy more space and require stronger operators when system voltage is high. As a result, using DC mechanical circuit breakers in a transfer switch provides that the transfer switch is inherently larger in size and requires more power to operate. In addition, DC mechanical circuit breakers are more difficult to pair with AC circuit breakers, as the AC circuit breakers are normally smaller in size. Semiconductor-based DC circuit breakers improve the switching reliabilities and reduce the size at the same voltage rating, which in turn provide smaller and more flexible designs for the transfer switches. In addition, to fully realize the advantage of DC power, high DC voltages are used. Traditional mechanical switches become complicated with bare minimum reliability when DC voltage is above 250V. For general purpose DC protection with voltage higher than 600V, mechanical switches start to face feasibility issues. For these high voltage DC switching or protection, semiconductor-based switches are more suitable.

FIG. 1 depicts an example semiconductor-based DC transfer switch 100. The semiconductor-based DC transfer switch 100 includes an AC power source 101, an AC circuit breaker 110, an AC circuit breaker handle 112, an AC circuit breaker mechanical arm 114, an actuator 130, a DC power source 103, a semiconductor-based DC circuit breaker 120, a DC circuit breaker handle 122, a DC circuit breaker mechanical arm 124, and a load 150. Power is provided by either the AC power source 101 or the DC power source 103. The actuator 130 is configured to mechanically move the AC circuit breaker mechanical arm 114 and the DC circuit breaker mechanical arm 124 in order to move the AC circuit breaker handle 112 and the DC circuit breaker handle 122 in such a way that only one of the two circuit breakers can be closed at any time. The semiconductor-based DC circuit breaker 120 is a semiconductor-based DC circuit breaker, for example one that can handle a high voltage DC power source.

The system includes two power sources (e.g., the AC power source 101 and the DC power source 103). In an embodiment, the AC power source 101 and the DC power source 103 may be, for example, utility power and power from a backup system such as a generator or battery or from a renewable power source such as solar or wind, respectively. In another embodiment, the two power sources are both DC power sources.

For residential uses, houses have seen an increased demand for electricity, especially with the growing popularity of electric vehicles. The increased demand may result in a possible shortage of electricity if relying on utilities alone. Further, under uncontrollable circumstances, such as extreme weather conditions, utility power may be disrupted. To ensure that basic essential functions of a home, such as air conditioners, cook tops, refrigerators and so on, are still available under such conditions, backup power systems have also become increasingly popular. Many utility companies now accept locally generated energy to be sold back to the grid, to save cost to the homeowner. As a result, more houses are equipped with additional energy sources than just utility power. Common energy sources as of today are backup generators, renewable sources such as solar systems, battery systems, electric vehicles, other renewable power sources, and/or alternative sources such as wind power and hydropower that may be less popular. These different power sources may be installed into a single home with many different combinations, together with the already available utilities. However, only one source can be used at a certain time to power the house. An energy management system is needed to switch between these power sources and to allow flexible configurations based on the needs of a customer. Similar issues may exist for commercial or industrial electrical systems.

A transfer switch as described herein is used to switch between the two power sources, for example, the AC power source 101 and the DC power source 103. Alternate current (AC) power is typically used in a majority of electrical systems as a form of supply. However, many electronic devices and end systems, such as electric vehicles, home appliances, and data centers use direct current (DC) power, for example high voltage DC power. For high voltage DC power, the DC power source 103 may be a high voltage power source with a voltage equal to or greater than 250V, in particular greater than 600V. The embodiments described below include systems with two power sources. If additional power sources are used, two or more of the described systems may be used as modules to manage the electrical system as described in FIGS. 13A, 13B, 14A, and 14B. In an embodiment, both power sources are DC power sources. In another embodiment, a single DC power source is used in which the transfer switch may be utilized for bi-directional DC power switching as described in FIG. 12.

The load 150 may be any electrical circuit including, for example, one or more appliances, lighting fixtures, a battery, an electric vehicle, and/or other electrical equipment.

The system includes two circuit breakers, including at least semiconductor-based DC circuit breakers for the one or more legs that use DC power. In FIG. 1, there is a DC power source 103 and an AC power source 102. The AC power source 102 is connected to the AC circuit breaker 110. The AC circuit breaker 110 may be any type of circuit breaker that is configured or rated for the respective voltage of the AC power source 102. The DC power source 103 is connected to a semiconductor-based DC circuit breaker 120. In an embodiment, there are two DC power sources and both circuit breakers are DC circuit breakers.

The semiconductor-based DC circuit breaker 120 is a solid-state circuit breaker. Solid state circuit breakers use power electronics as switching components instead of contacts as in traditional thermal-magnetic circuit breakers, and the switching process is arc free. Solid state circuit breakers may be used in both AC and DC systems. However, solid state circuit breakers normally have an air gap in series with power electronic components for isolation purposes. For solid state circuit breakers designed for AC systems, air gaps may be used as fail-safe mechanisms when power electronics fail in shorted conditions. In such a situation, the arc can simply interrupt AC power with the help of natural zero crossing. In DC systems, however, simple air gaps may not be used because of a possibility of its own failure on interruption. In a first embodiment, the transfer switch includes a first semiconductor-based (solid-state) DC circuit breaker 200 with redundant power electronics that reduces or eliminates DC arcs in air gaps under a single component failure mode analysis.

Figure 2:
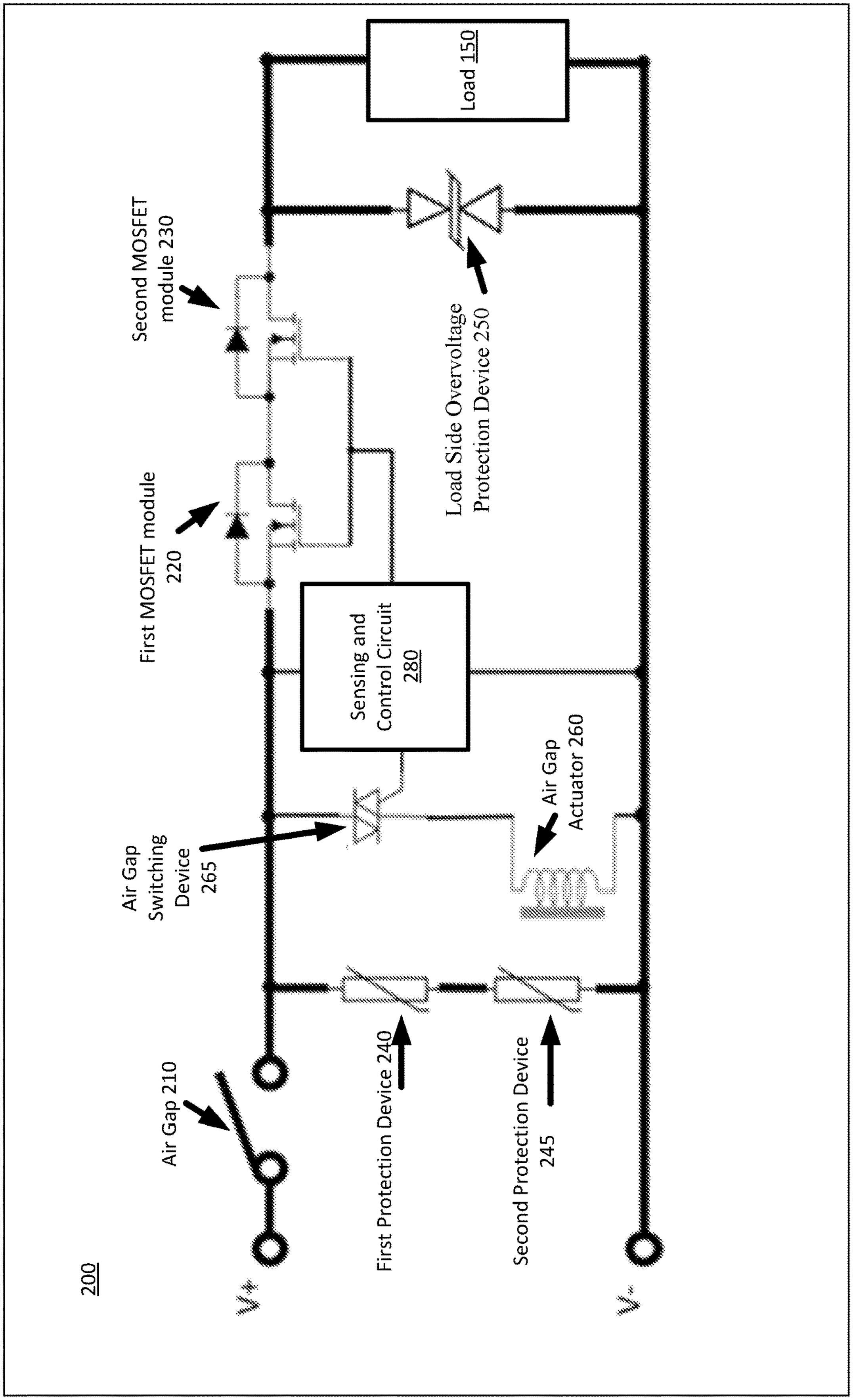
FIG. 2 depicts an example semiconductor-based DC circuit breaker that may be used in the semiconductor-based DC transfer switch of FIG. 1.

FIG. 2 depicts a diagram of an example first solid-state DC circuit breaker 200 for use in a transfer switch. An air gap 210 is in series to two power MOSFET (metal oxide semiconductor field effect transistor) modules, a first MOSFET module 220 and a second MOSFET module 230. The first MOSFET module 220 and the second MOSFET module 230 may each be single MOSFET or multiple MOSFETs in parallel. The first MOSFET module 220 and the second MOSFET module 230 are also set in series, where a source of one module is connected to drain of the other module. A sensing and control circuit 280 is used to realize functions of the first solid-state DC circuit breaker 200. An air gap actuator 260 with an air gap switching device 265 is used to open the air gap 210 when necessary. For overvoltage or surge protection for the sensing and control circuit 280, two devices, a first protection device 240 and a second protection device 245, such as a metal-oxide varistor (MOV) or transient-voltage-suppression (TVS) diode are connected in series. Both the first protection device 240 and the second protection device 245 have threshold voltages higher than the system voltage. For overvoltage protection after switching off, a load side overvoltage protection device 250 such as MOV, TVS or snubber may be used.

TVS semiconductor diodes are monolithic devices fabricated using standard semiconductor techniques. TVS semiconductor diodes include very fast response time, low clamping voltage, and high reliability. MOV devices are ceramic masses composed of metal-oxide grains. The boundary between grains forms a region with non-linear current and voltage performance, which behaves as a diode. The diodes arrange themselves in a random multitude of parallel and series combinations.

Figure 3:
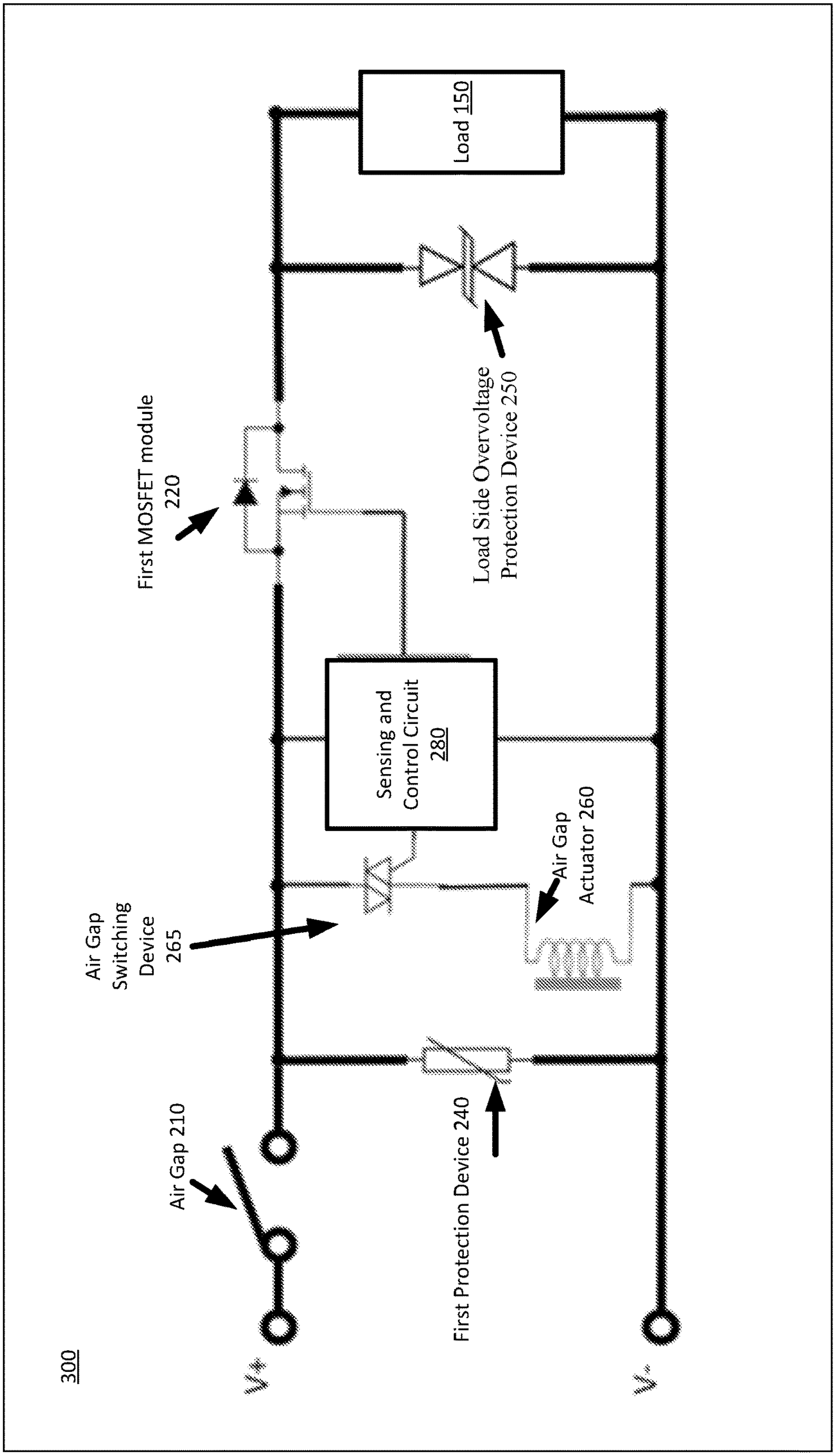
FIG. 3 depicts a non-redundant semiconductor-based DC circuit breaker.

The first MOSFET module 220 and the second MOSFET module 230 function as each other's redundancy. The first protection device 240 and the second protection device 245 also function as each other's redundancy. FIG. 3 depicts an example of a circuit 300 that lacks redundancy. Without redundancy, under circuit fault conditions, the sensing and control circuit 280 senses the fault condition and then sends a signal to switch off the first MOSFET module 220. Then the sensing and control circuit 280 sends a signal to turn on the air gap switching device 265 to allow the air gap actuator 260 to open the air gap 210. Three problems may arise in this configuration. First, when the air gap 210 opens, the air gap 210 must interrupt the current supplied through the air gap switching device 265 to the air gap actuator 260. Depending on the design, the air gap 210 may not be able to interrupt such a current at higher DC voltage. Second, under single component failure analysis, if the first MOSFET module 220 fails as shorted, the air gap 210 is the only component that can be used to interrupt the load current. Under high DC voltage, a very complicated air gap 210 is needed to interrupt such a current. Third, under single component failure analysis, if the first protection device 240 is shorted, only the air gap 210 can open to stop the current drawn by the first protection device 240. Like before, under high DC voltage, a complicated air gap design is needed.

Referring back to the solid-state DC circuit breaker 200 of FIG. 2, three aspects are implemented to address the problems described above. First, the second MOSFET module 230 is added in series to the first MOSFET module 220. Either the first MOSFET module 220 or the second MOSFET module 230 can thus realize circuit breaker functions without the other. For example, under single component failure analysis, if the first MOSFET module 220 fails shorted. the second MOSFET module 230 may still be used to switch off the DC current first before opening the air gap 210. This way, the air gap 210 may be simplified since the air gap 210 is not required to interrupt the DC current. Second, the air gap switching device 265 is timed for just long enough to open the air gap 210 and then is turned off. This way, an arc may be drawn for a short amount of time in the air gap 210, but the air gap switching device 265 will help to extinguish the arc by cutting off current when turned off, and an interruption is provided. Third, since both the first protection device 240 and the second protection device 245 have a higher threshold voltage than the system voltage, the second protection device 245 still can keep all the functions in case of the first protection device 240 is shorted. Then, the control circuit can detect the failure of the first protection device 240 and allow the air gap 210 to open without current. A drawback of using the first protection device 240 and the second protection device 245 in series is that components used in the circuit need to be sized up to the higher threshold voltage, which is the sum of threshold voltages of the first protection device 240 and the second protection device 245.

Figure 4:
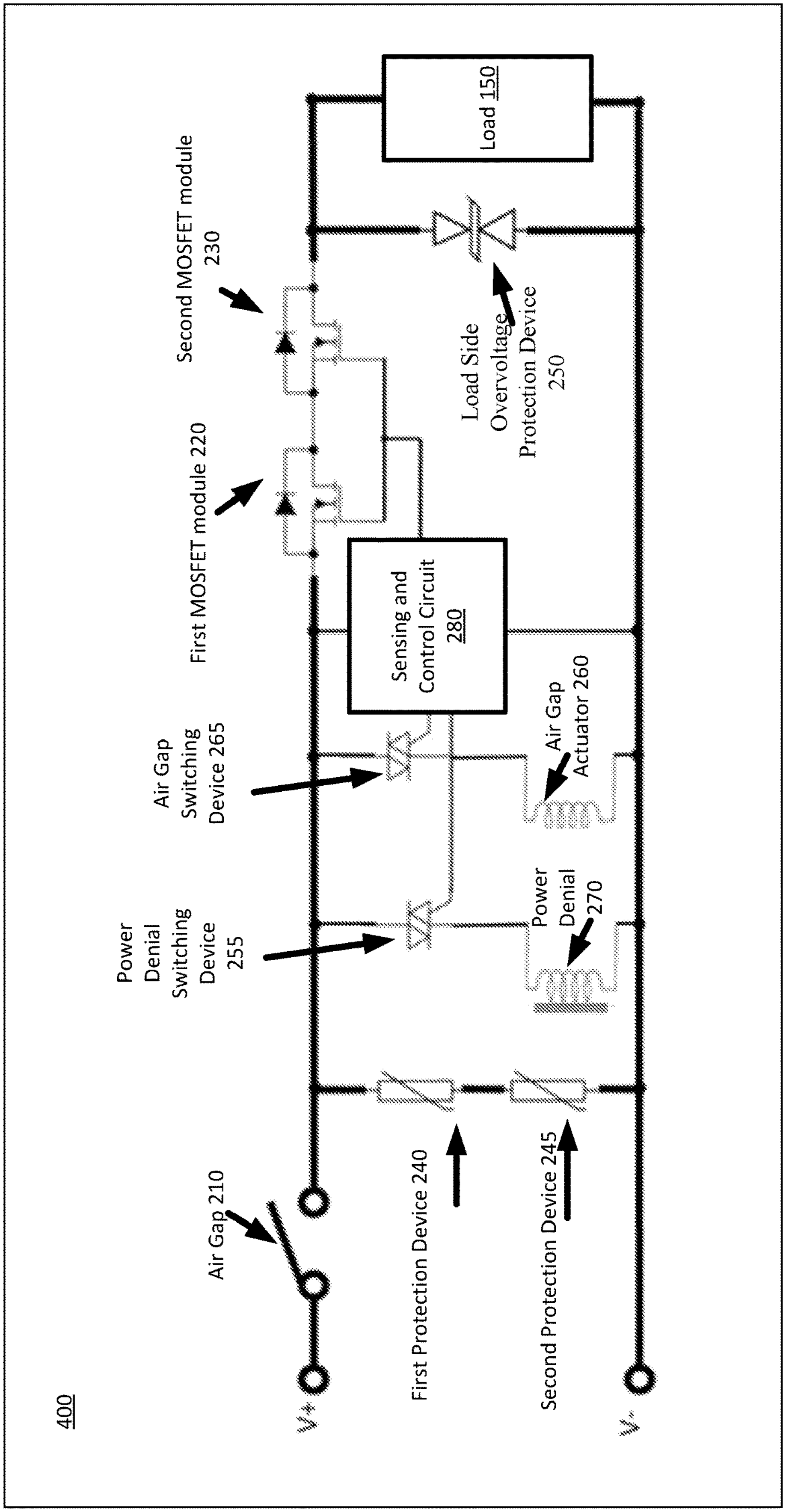
FIG. 4 depicts another example of a semiconductor-based DC circuit breaker that may be used in the semiconductor-based DC transfer switch of FIG. 1.

In an embodiment, a power denial feature may be included in the circuit 400, as shown in FIG. 4. The power denial 270, once engaged, can physically lock the air gap 210 in open position without possibility of reclosing. This can be used if any failed components have been detected, such as the first MOSFET module 220 or the first protection device 240. If a component failure is detected, the control circuit sends a signal to turn off the first MOSFET module 220 and the second MOSFET module 230, and then sends signal to turn on the power denial switching device 255 to engage the power denial mechanism. The power denial switching device 255 is timed only long enough to open the air gap 210 and is turned off again after to provide interruption.

While the solid-state DC circuit breaker 200 may be used in the transfer switch of FIG. 1, this type of solid-state DC circuit breaker 200 may not realize the full potential of solid-state technology in DC applications. The use of a redundant set of power electronics may create extra heat that makes thermal management and creating higher amperage breakers difficult. The use of a redundant set of power electronics may also not be necessary for interruption purposes under normal conditions.

Figure 5:
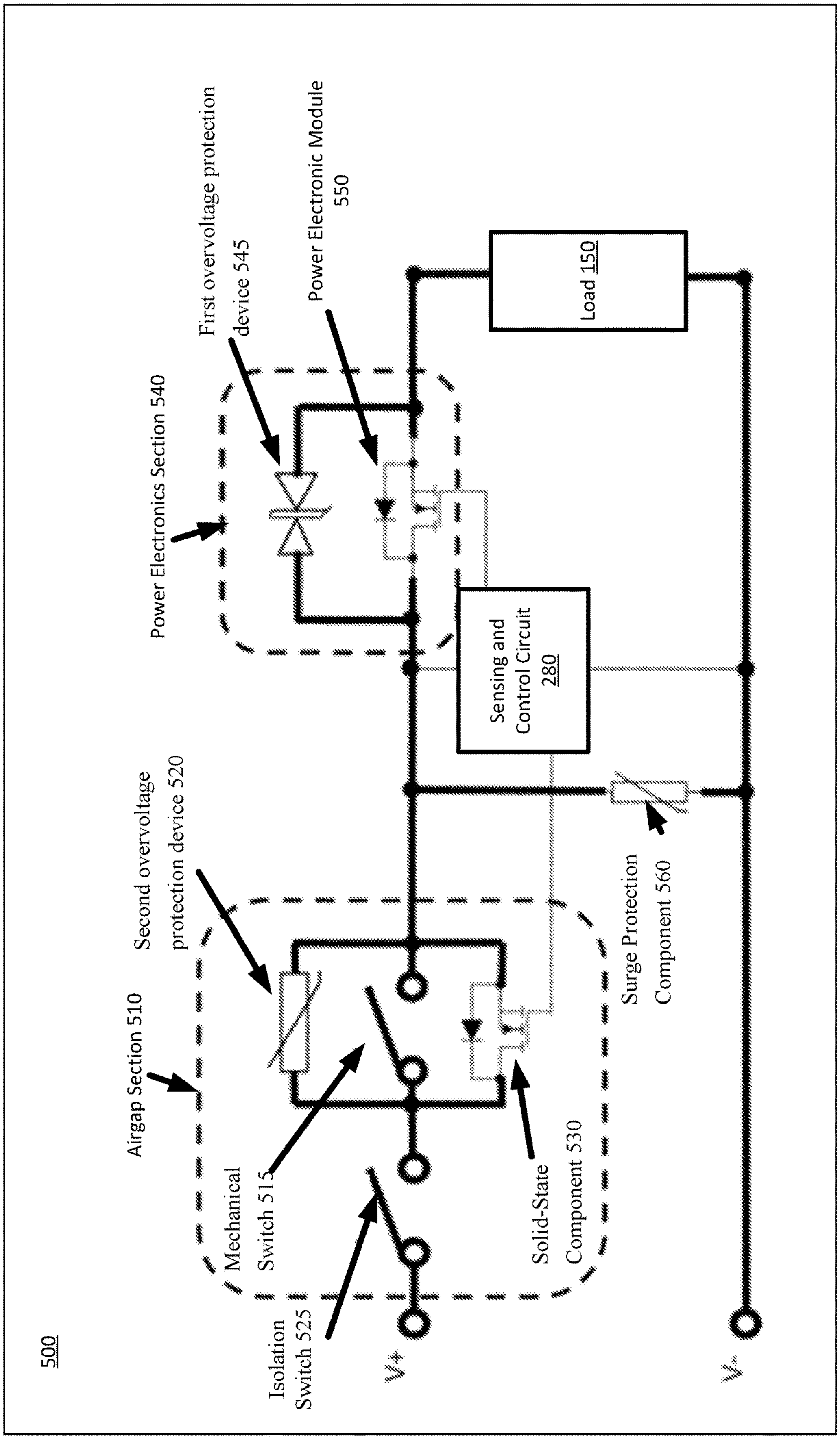
FIG. 5 depicts an example semiconductor-based DC circuit breaker that may be used in the semiconductor-based DC transfer switch of FIG. 1.

FIG. 5 shows a diagram of a second semiconductor-based (solid-state) DC circuit breaker 500 for use in the transfer switch 100 of FIG. 1. There are two sections connected in series in the main current path, a power electronics section 540 for normal use interruption, and an air gap section 510 for fail-safe interruption and isolation. A sensing and control circuit 280 is also provided to control the main current path. The sensing and control circuit 280 may be powered by the system voltage, as indicated in FIG. 5, or may be powered by another source. The sensing and control circuit 280 is also protected by a surge protection component 560 that may be a component such as a MOV or TVS.

The power electronics section 540 includes main power electronics modules, such as the power electronic module 550 that includes one or more MOSFETs or Thyristors, and a first overvoltage protection device 545. The first overvoltage protection device 545 is used to protect the main power electronics modules during the overvoltage after fast interruptions. The power electronic module 550 may be a single component or multiple components connected in parallel. The first overvoltage protection device 545 may be connected in parallel to the power electronic module 550, as shown in FIG. 5, or may be connected between the system voltage after the main power electronics.

The air gap section 510 is in series to the power electronics section 540 and is configured to perform fail-safe interruption and to provide isolation. The air gap section 510 includes an isolation switch 525 that is connected in series to a fail-safe interruption combination. The fail-safe interruption combination has a mechanical switch 515 connected in parallel to a solid-state component 530, and a second overvoltage protection device 520 such as a MOV or a TVS. The second overvoltage protection device 520 may be a single components or multiple components connected in parallel. Both the mechanical switch 515 and the isolation switch 525 may be triggered to turn off by the sensing and control circuit 280 through actuators, such as solenoids and electromagnets. The mechanical switch 515 and the isolation switch 525 are configured in such a way that the mechanical switch 515 is always open before the isolation switch 525.

Figure 6A:
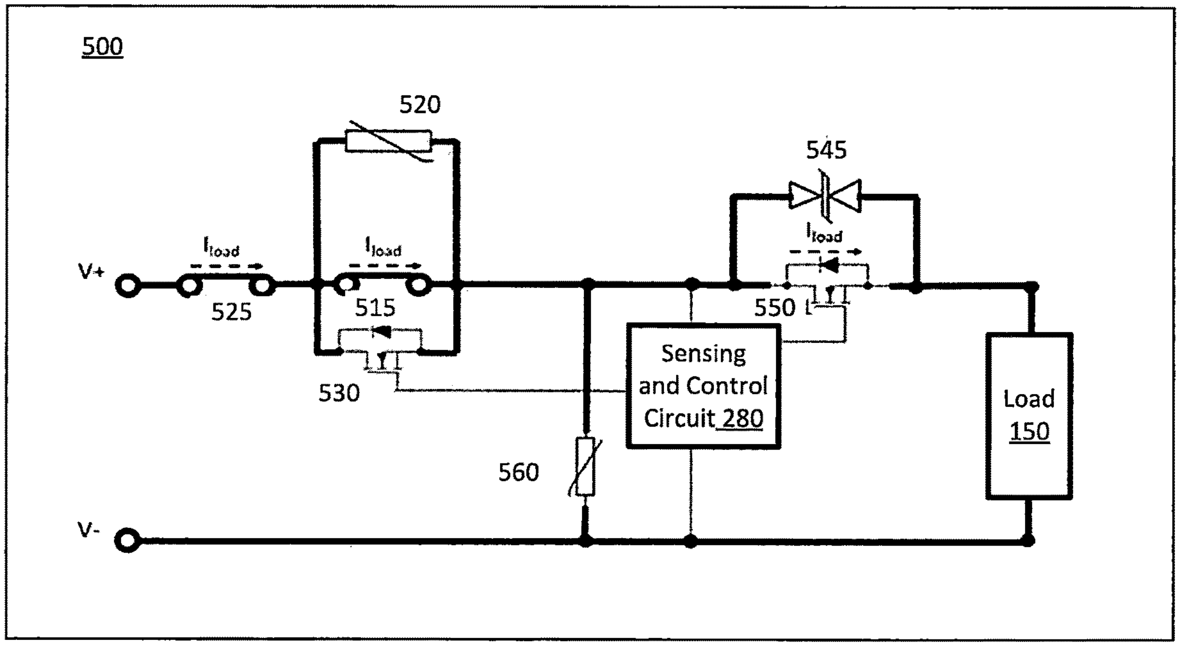
FIGS. 6A and 6B depict the operation of the semiconductor-based DC circuit breaker of FIG. 5.
Figure 6B:
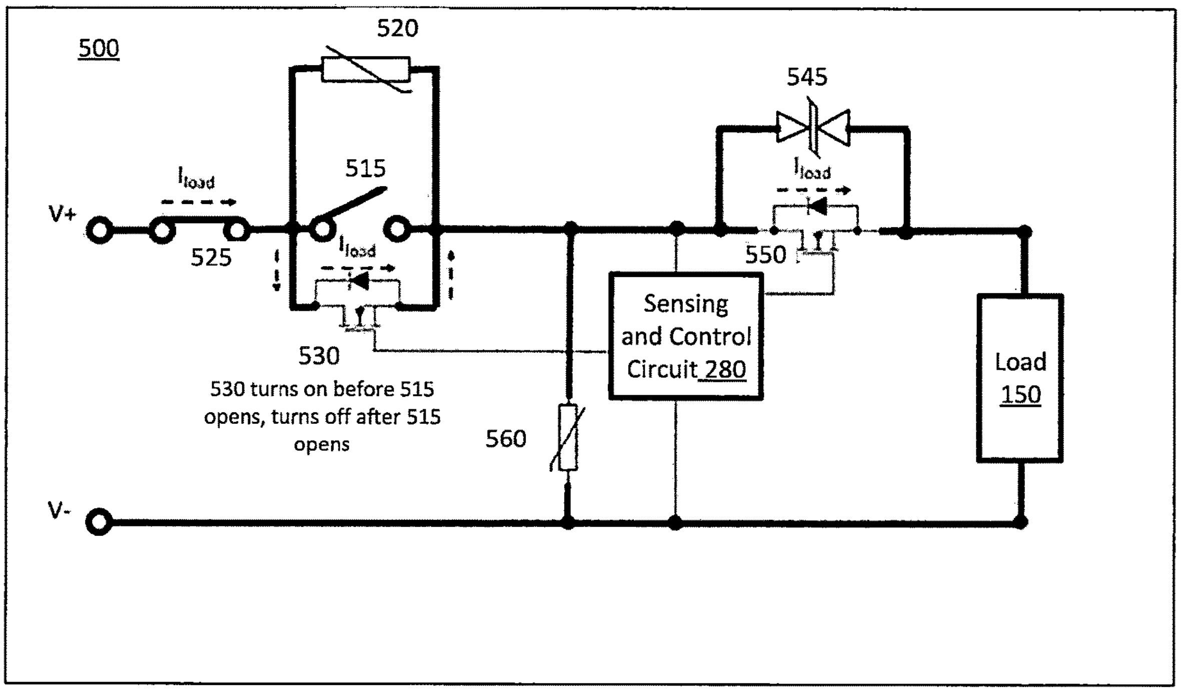

The fail-safe operation sequence is as following: under conditions with component failures, such as when the power electronic module 550 is shorted, the sensing and control circuit 280 detects a fault condition or receives turn-off signals and sends a turn-off signal to the power electronic module 550. However, the power electronic module 550 is not able to interrupt, and load current is still present, as shown in FIG. 6A. Mechanical switches, such as the isolation switch 525 and the mechanical switch 515, may be unable to interrupt the currents on their own, for example when the system voltage is high. The combination of the mechanical switch 515, the solid-state component 530, and the second overvoltage protection device 520 is used to provide successful interruption. In this case, the solid-state component 530 becomes the main interruption component and is not affected by the lack of zero crossing. Two different methods may be used to sequence the operations between the components. For the first method, after a time delay, sensing and control circuit 280 sends an open signal to the mechanical switch 515 and sends a turn-on signal to the solid-state component 530 with or without a time delay. The solid-state component 530 is then turned on to carry the load current, and the mechanical switch 515 is opened by its actuator. The solid-state component 530 is then turned off after a time delay that allows the mechanical switch 515 to physically open enough to withstand the overvoltage without breaking down, as shown in FIG. 6B. If the overvoltage is higher than the threshold of the second overvoltage protection device 520, the second overvoltage protection device 520 turns on automatically to absorb the energy. For this first method, the advantage is that the mechanical switch 515 does not need to open under current, so arcing is eliminated or minimized. The drawback is that the solid-state component 530 needs to stay on with load current for a relatively long period, since the solid-state component 530 needs to stay on before the mechanical switch 515 opens and to stay on after the mechanical switch 515 opens wide enough to withstand overvoltage. With a large load current, the long on-time of the solid-state component 530 provides that more expensive and sophisticated components are to be used. Therefore, this method is better suited for smaller load current.

Figure 7A:
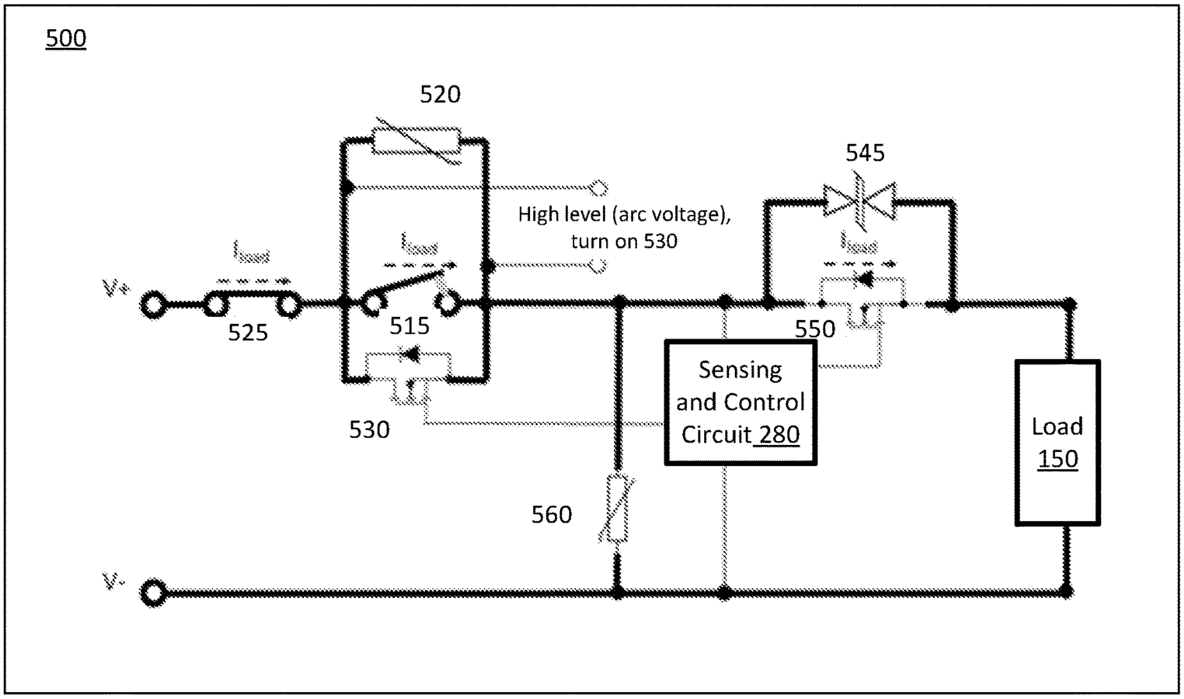
FIGS. 7A and 7B further depict the operation of the semiconductor-based DC circuit breaker of FIG. 5.
Figure 7B:
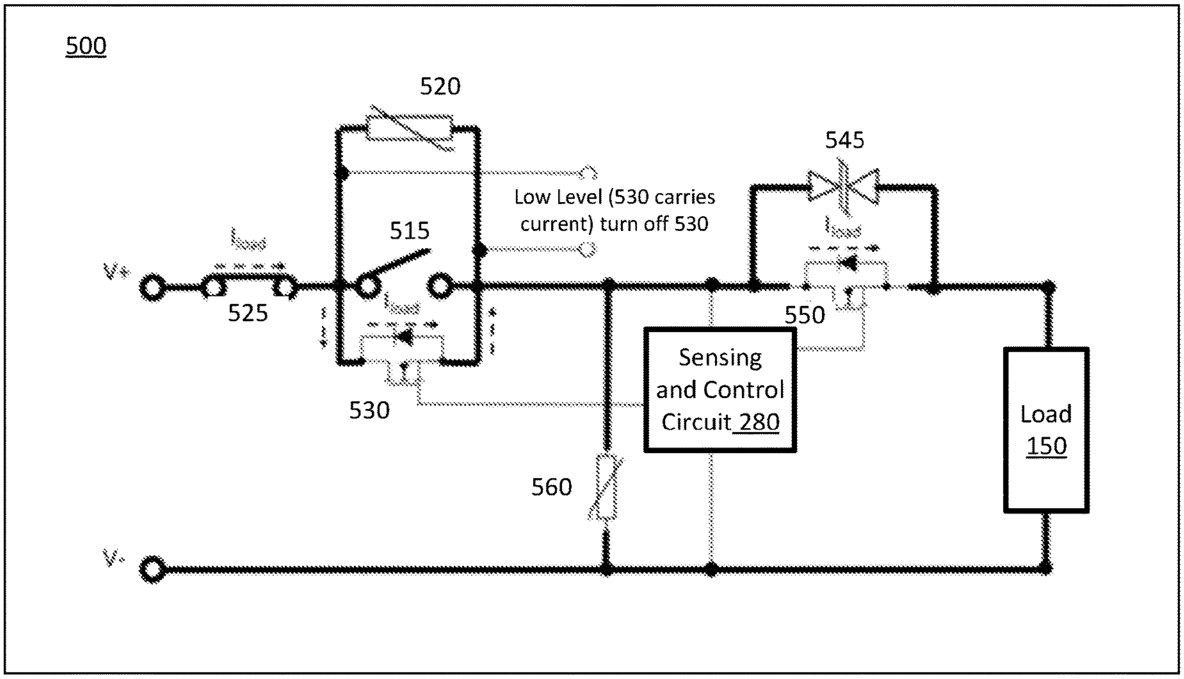

For the second method, a voltage monitoring is added across the mechanical switch 515, and the voltage across the mechanical switch 515 is used to determine if the solid-state component 530 is turned on. When the mechanical switch 515 is opened by the actuator, an arc is drawn, and a voltage jump in the order of 10-20V is seen across the mechanical switch 515. The higher voltage level may be used as the trigger to turn on the solid-state component 530, and hence commute the current from the mechanical switch 515 to the solid-state component 530, as shown in FIG. 7A. After current is transferred to the solid-state component 530, the on-state voltage drop of the solid-state component 530 is normally much smaller (e.g., on the order of 3-4V). This lower voltage level can be used as the trigger to turn off the solid-state component 530, and the current is interrupted, as shown in FIG. 7B. The advantage of this second method is that the solid-state component 530 is only turned on when necessary and, therefore, does not require expensive components. The drawbacks are arcs between the mechanical switch 515 contacts, and the solid-state component 530 may have to be turned on and off more than once until the mechanical switch 515 is opened wide enough to withstand overvoltage. After the load current is interrupted by the combination of the mechanical switch 515, the solid-state component 530, and the second overvoltage protection device 520, the isolation switch 525 is then opened for isolation, as shown in FIG. 5.

When the circuit breaker 500 is in normal condition, the operating sequence above may still be implemented. The difference is that the power electronic module 550 interrupts the current at the beginning of the sequence, and the air gap section 510 opens without load current. To reclose the circuit, the isolation switch 525 and the mechanical switch 515 are first closed in no particular order. Then, the sensing and control circuit 280 perform a self-test and turns on the power electronic module 550 if the self-test is successful. In case of a failure, such as a shorted power electronic module 550, the self-test is unsuccessful, and the operation sequence for the air gap section 510 as described above is performed to interrupt current again. In case of another failure, such as a shorted solid-state component 530, the power electronic module 550 does not turn on and no-load current is available.

Figure 8:
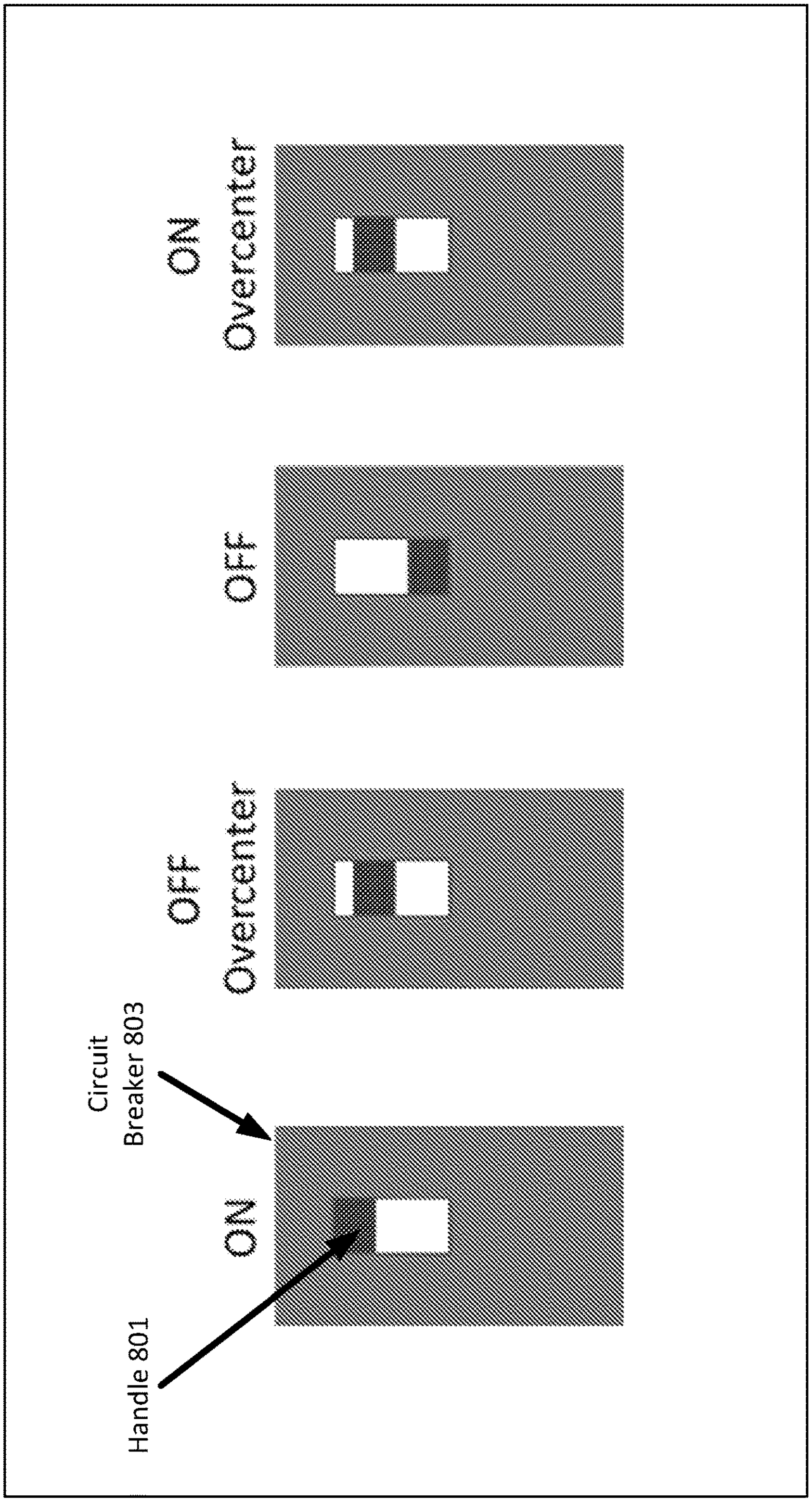
FIG. 8 depicts an example of handle positions for the circuit breakers of FIG. 1.

Alternative semiconductor-based (solid-state) DC circuit breakers may be used. The semiconductor-based DC circuit breaker(s) 120 and the AC circuit breaker 110 are each provided with a handle 112, 122 that is configured to turn ON or OFF the respective circuit breaker 110, 120. FIG. 8 depicts an example of handle positions for a circuit breaker 803. In the ON position, the handle 801 is at a top position (e.g., up position, ON position) of the circuit breaker 803. In the OFF position, the handle 801 is at a bottom position (e.g., down position, OFF position) of the circuit breaker 803. In a scenario where the circuit breaker 803 is inverted, the ON position and the OFF position may also be inverted (e.g., ON at the bottom, OFF at the top). A mechanism such as a spring (not shown) keeps the handle 801 at one of the two positions (ON or OFF) There are two further intermediary positions for the handle 801. In the OFF OVERCENTER position, the handle 801 is moving from the ON position to the OFF position. The handle 801 cannot and does not stay at this position due to the spring mechanism, but rather, the position is transitory. Similarly, there is an ON OVERCENTER position. In operation, when the handle 801 is at the ON position, the circuit breaker 803 is closed and can conduct current. As an operator (or machine) moves the handle 801 from the ON position, the handle 801 goes into an OFF OVERCENTER position, beyond which the breaker mechanism opens the circuit breaker 803 without further movement from the handle 801. Then, the circuit breaker 803 is in the OFF position. To turn on the circuit breaker 803 from the OFF position, the handle 801 is then brought to an ON OVERCENTER position, beyond which the breaker mechanism closes the circuit breaker 803 without further movement from the handle 801.

Referring back to FIG. 1, the semiconductor-based DC transfer switch 100 includes an actuator 130 that is connected to the AC circuit breaker mechanical arm 114 and the DC circuit breaker mechanical arm 124. The actuator 130 may be manual, non-automatic, or automatic. A manual actuator may be manually rotated. A non-automatic actuator may be rotated using an electronically operated mechanical device. An automatic actuator may be rotated automatically by a controller/processor/algorithm that determines when to activate the switch. The actuator 130 may include a motor that moves the AC circuit breaker mechanical arm 114 and the DC circuit breaker mechanical arm 124 by rotating the actuator 130. The AC circuit breaker mechanical arm 114 and the DC circuit breaker mechanical arm 124 are configured to move the AC circuit breaker handle 112 and the DC circuit breaker handle 122 respectively so that only one circuit breaker is ON at any given time. The AC circuit breaker mechanical arm 114 and the DC circuit breaker mechanical arm 124 may be made of any material. The AC circuit breaker mechanical arm 114 and the DC circuit breaker mechanical arm 124 may be shaped in a Y configuration as depicted. Different configurations may be possible.

Figure 9:
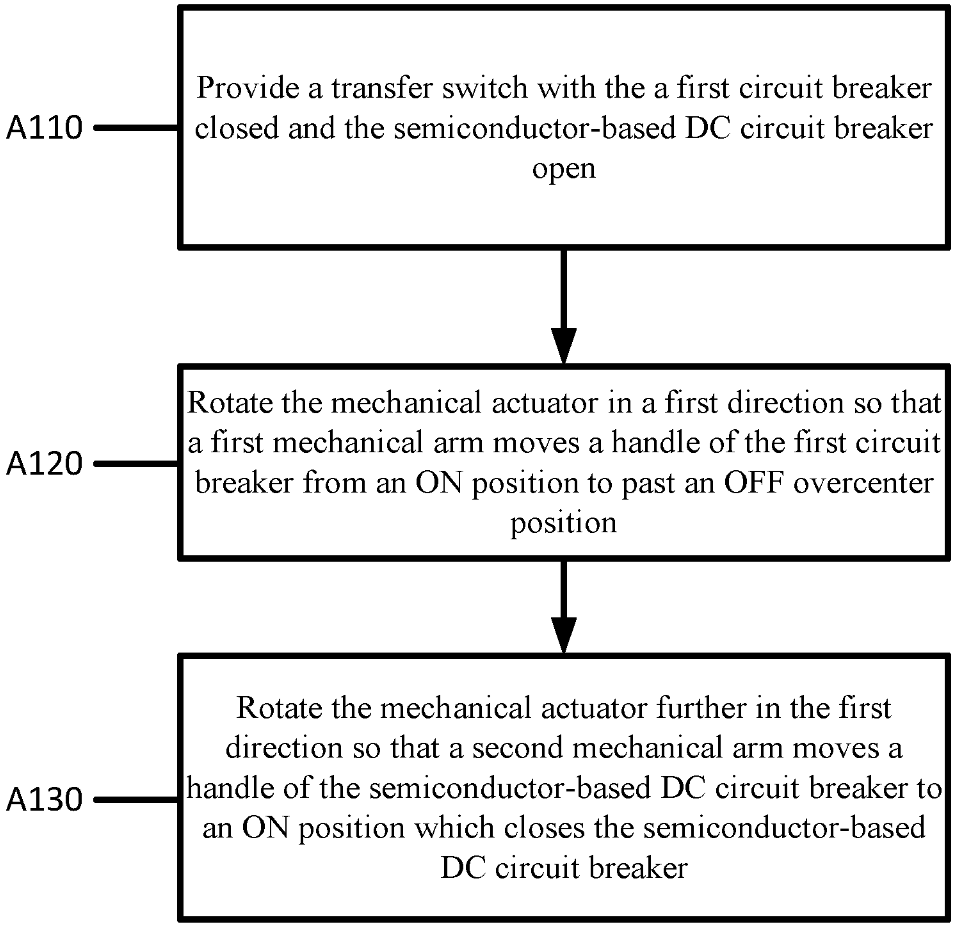
FIG. 9 depicts a workflow of one embodiment of a method for using the semiconductor-based DC transfer switch of FIG. 1.

FIG. 9 depicts a workflow of a method for switching between power sources. At act A110, a transfer switch as described above in FIG. 1 is provided with the AC circuit breaker 110 closed and the semiconductor-based DC circuit breaker 120 open. At act A120, the actuator 130 is rotated in a first direction (counterclockwise) so that the AC circuit breaker mechanical arm 114 moves the AC circuit breaker handle 112 of the AC circuit breaker 110 from an ON position to past an OFF overcenter position, which opens the AC circuit breaker 110; the DC circuit breaker mechanical arm 124 moves the DC circuit breaker handle 122 of the semiconductor-based DC circuit breaker 120 below an ON overcenter position, which leaves open the semiconductor-based DC circuit breaker 120. At act A130, the actuator 130 is further rotated in the first direction (counterclockwise) so that the DC circuit breaker mechanical arm 124 moves the DC circuit breaker handle 122 to an ON position, which closes the semiconductor-based DC circuit breaker 120.

Figure 10:
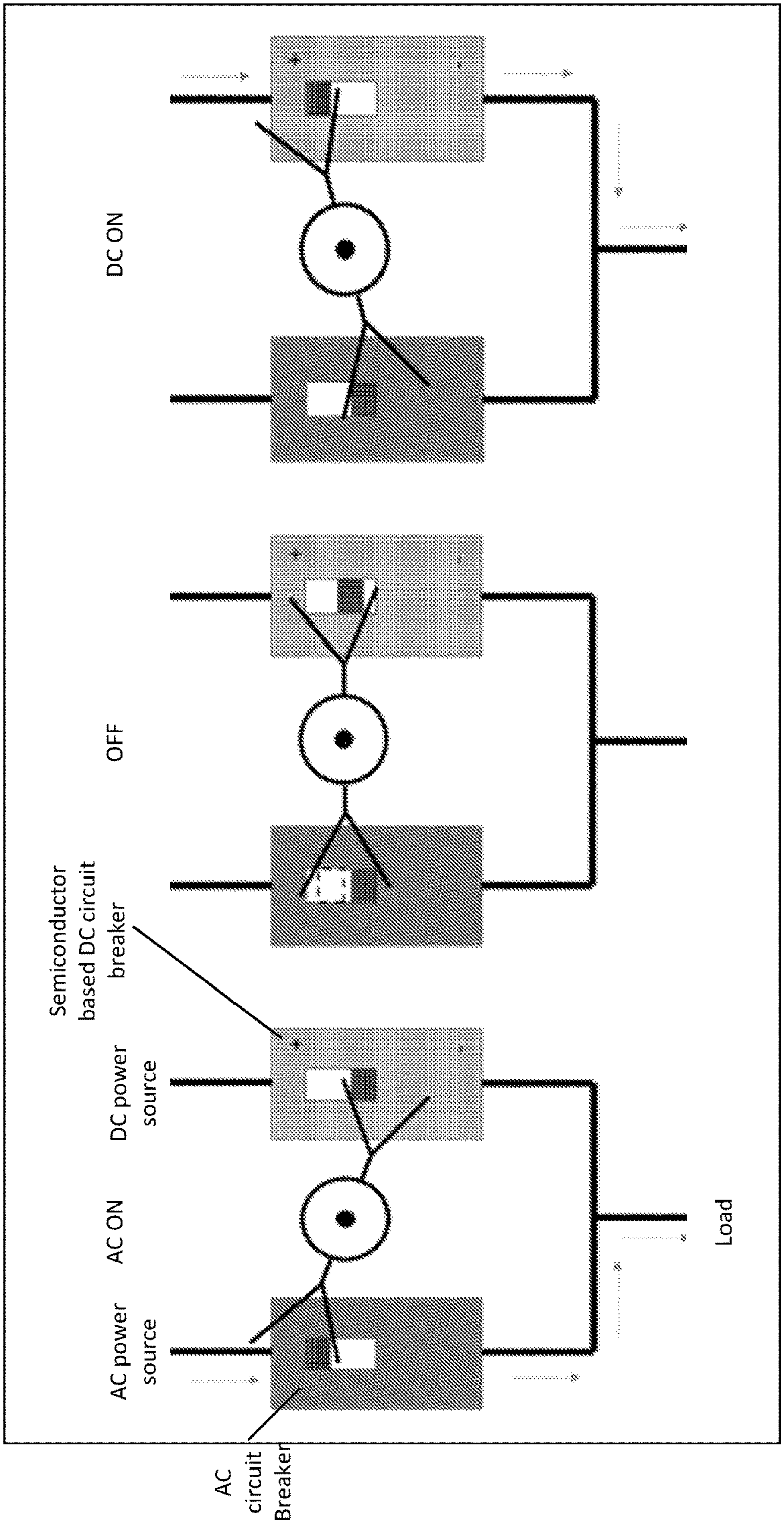
FIG. 10 depicts positions of handles and mechanical arms of the semiconductor-based DC transfer switch of FIG. 1 in relation to the workflow of FIG. 9.

In operation, FIG. 10 shows the three positions: AC ON, OFF, DC ON for a transfer switch with an AC power source (on the left) and a DC power source (on the right). In FIG. 10, for AC ON, the AC circuit breaker 110 is closed, and the semiconductor-based DC circuit breaker 120 is open, and the AC power is allowed to flow to the load 150. As the actuator 130 is rotated counterclockwise, the AC circuit breaker mechanical arm 114 moves the AC circuit breaker handle 112 past OFF OVERCENTER position, and an AC breaker operating mechanism opens the AC circuit breaker 110. On the other side, the DC circuit breaker mechanical arm 124 moves the DC circuit breaker handle 122 but still below the ON OVERCENTER position. Therefore, the DC circuit breaker 120 remains open, and no power is supplied to the load 150. The transfer switch 100 is in OFF position. As the actuator 130 continues to rotate counterclockwise, the DC circuit breaker mechanical arm 124 eventually moves the DC circuit breaker handle 122 far enough to turn on the DC circuit breaker 120, and the transfer switch 100 is in DC ON position. To change back to AC power, the opposite sequence applies where the actuator 130 is rotated in a second direction (clockwise).

Figure 11:
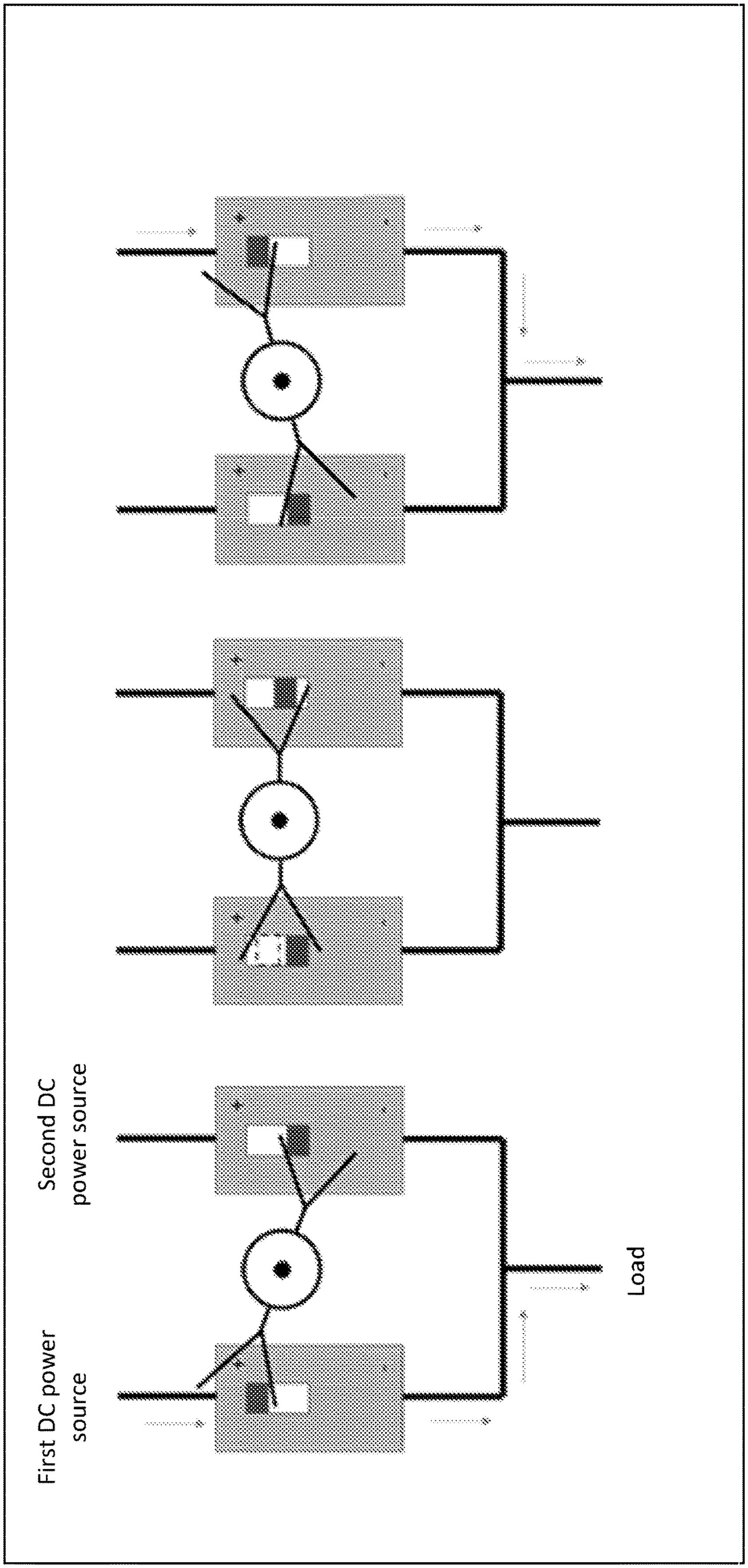
FIG. 11 depicts operation of a semiconductor-based DC transfer switch with two DC power sources according to an embodiment.

The above operating sequence also applies if the two sources are both DC power sources and two semiconductor-based DC circuit breakers 120 are used. The load 150 may be fed by either DC source based on the position of the actuator 130, as shown in FIG. 11.

Figure 12:
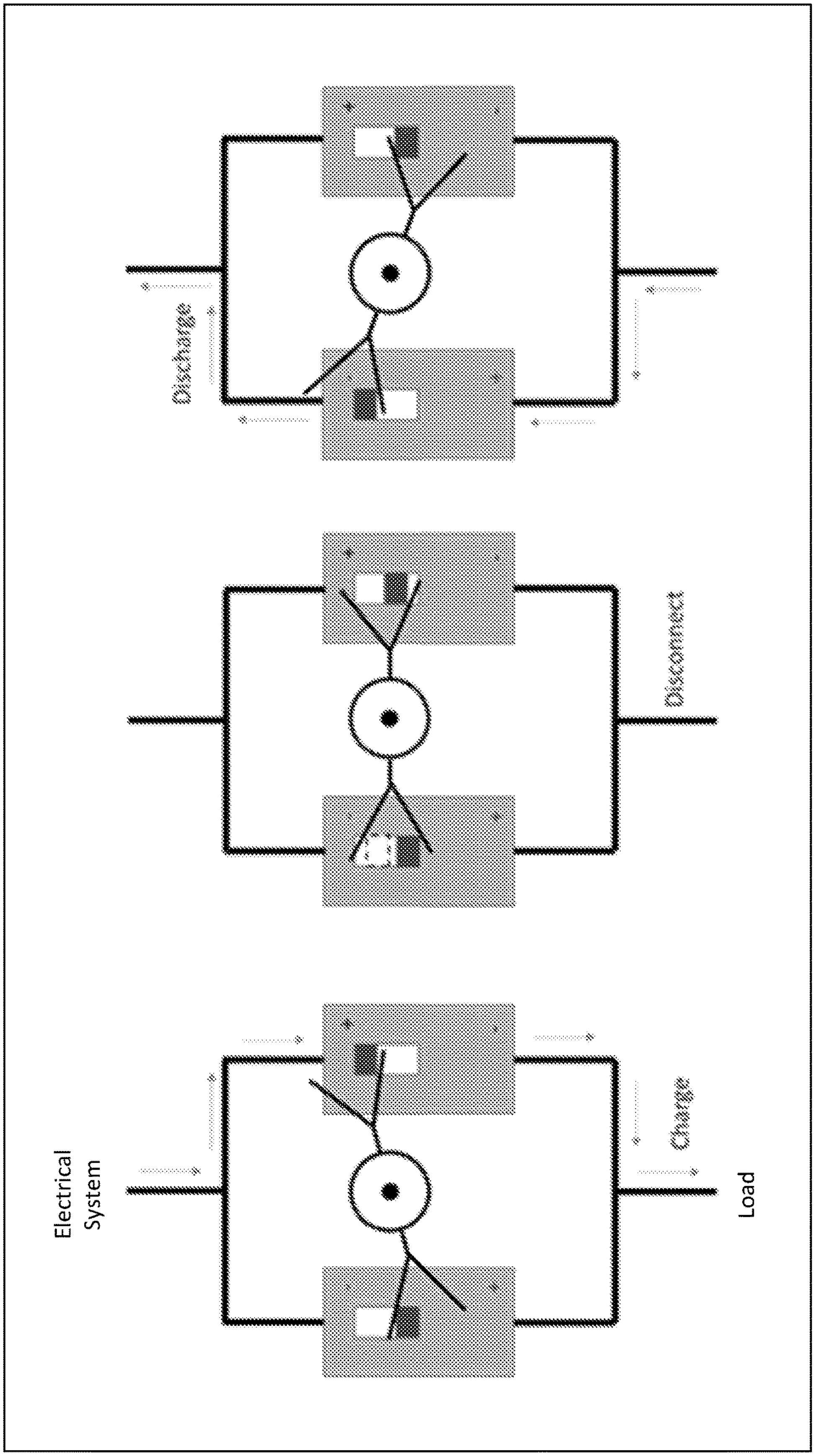
FIG. 12 depicts operation of a bidirectional semiconductor-based DC transfer switch according to an embodiment.

In an embodiment, applications may require bidirectional DC power flow. For example, in electric vehicle charging applications, utility power can be converted to high voltage DC and applies fast charging to the vehicle. At the same time, the vehicle can also send high voltage DC power back to utilities for savings by an owner on an energy bill. In such applications, only one direction of power flow at any given time, and the proposed transfer switch can provide a solution as in FIG. 12. In FIG. 12, one of the solid-state DC circuit breakers 120 is reversed (negative on top, positive on bottom), which allows the load 150 to discharge back into the system as shown on the right.

The embodiments described above include two power sources 101, 103 (of in the case of FIG. 12 a bidirectional transfer switch). In another application, more than two power sources may be used in an energy management system. In an embodiment, the semiconductor-based DC transfer switch 100 may be used for modular switching combinations for flexible energy management.

Figure 13A:
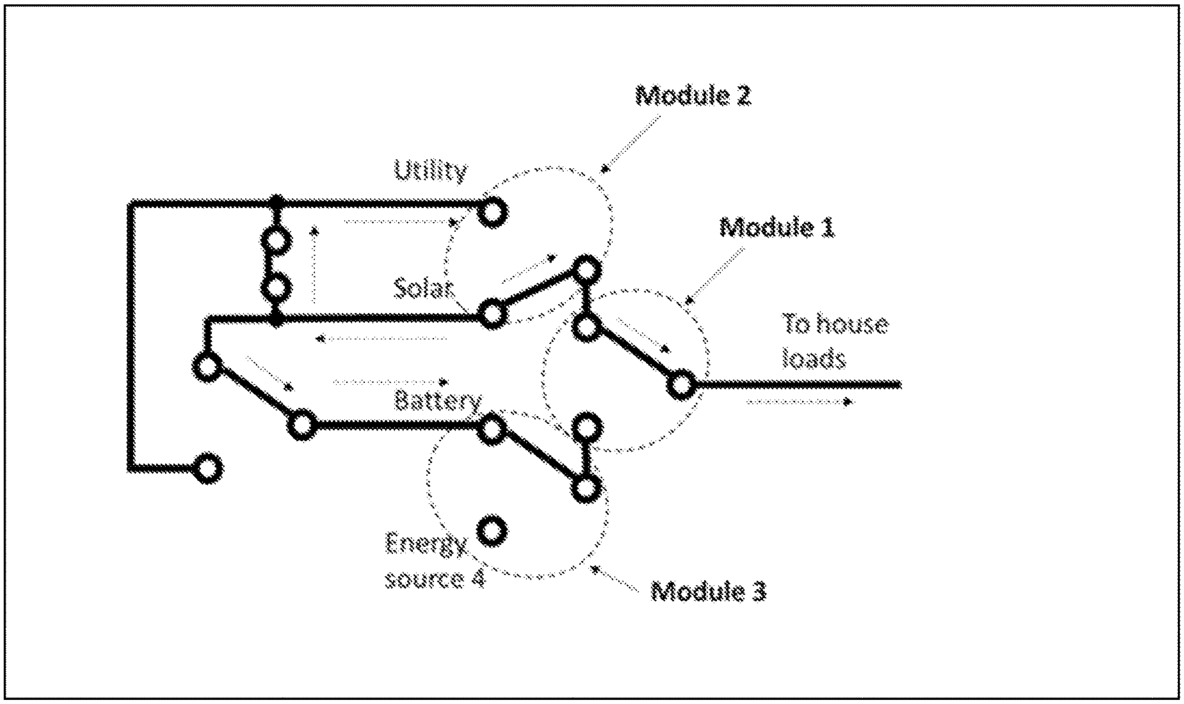
FIGS. 13A and 13B depict examples of the semiconductor-based DC transfer switch used as modules in an electrical system.
Figure 13B:
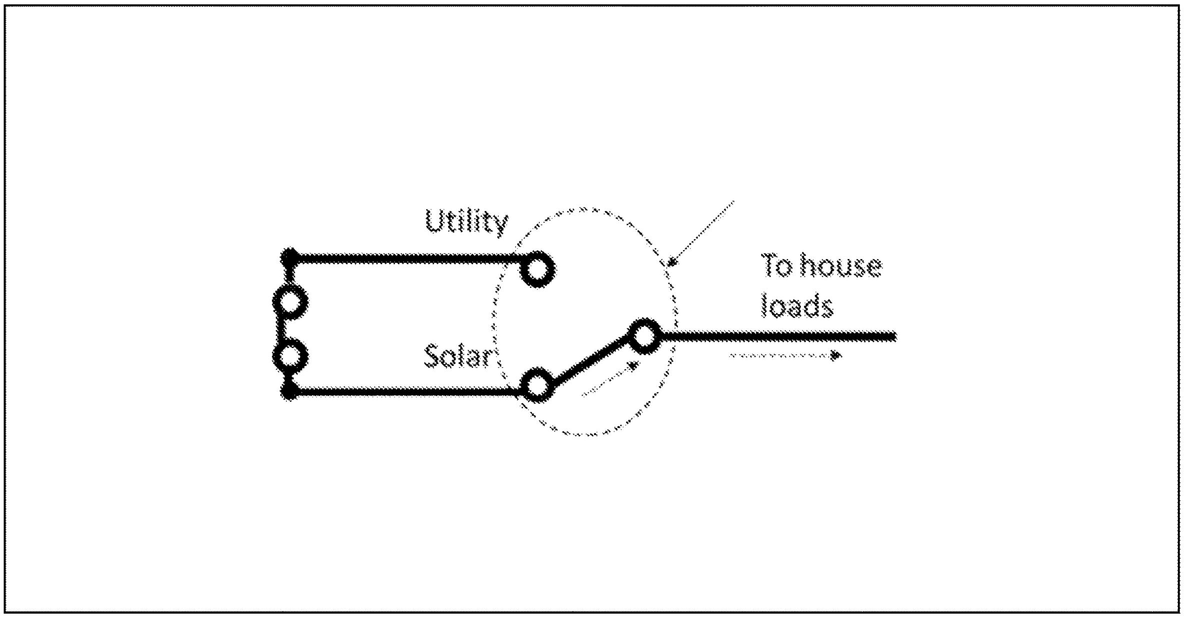
Figure 14A:
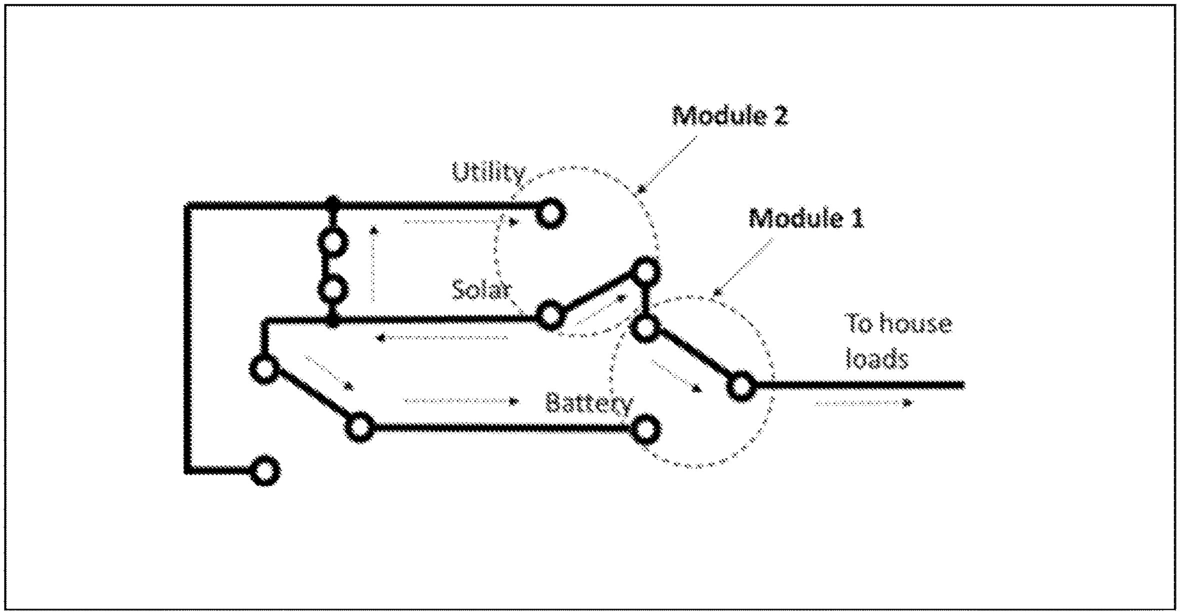
FIGS. 14A and 14B depict examples of the semiconductor-based DC transfer switch used as modules in an electrical system.
Figure 14B:
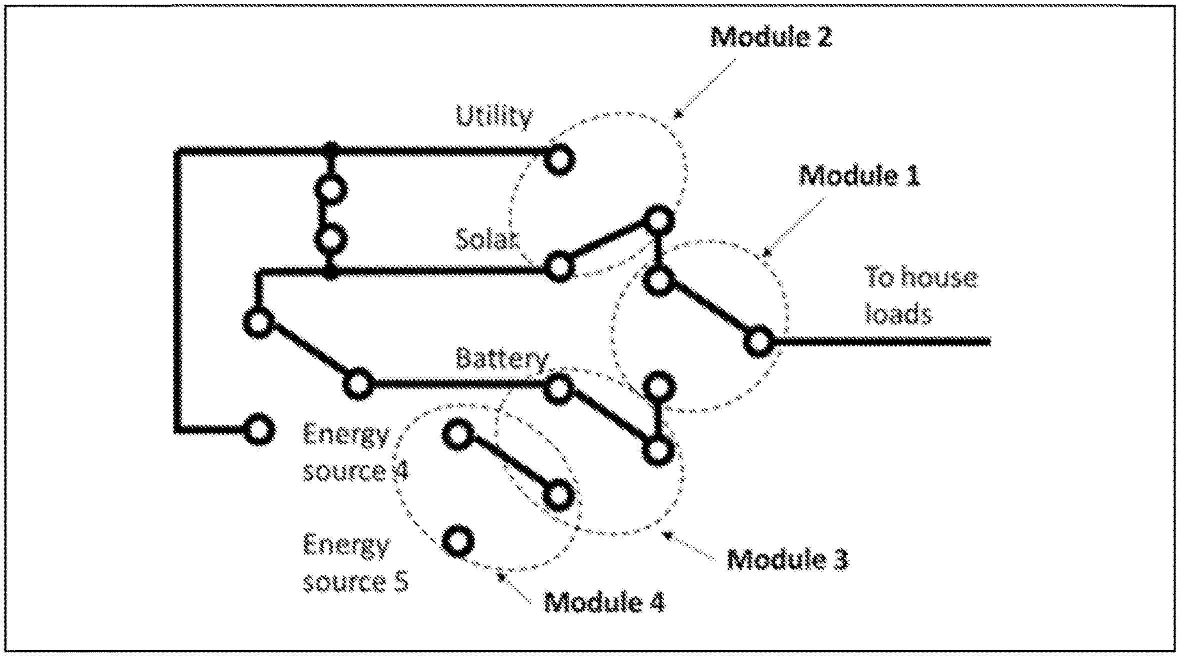

FIGS. 13A, 13B, 14A, and 14B depict embodiments where the semiconductor-based DC transfer switch 100 may be used for modular switching combinations for flexible energy management. Each switching module may be a semiconductor-based DC transfer switch 100. One advantage of the modular system in FIGS. 13A, 13B, 14A, and 14B is that the modular system can easily accommodate more or fewer energy sources by adding or removing modules. For example, if users prefer using solar to power the house and selling excessive energy back to the grid, only one module is needed as shown in FIG. 13B. In this case, instead of solar, the user can also choose to have a battery or a backup generator for backup purposes only if the utility company does not allow energy back to grid. If users select to have both solar and battery power, two modules are needed, as shown in FIG. 14A. If users select to have more than four sources, modules can also be added, as shown in FIG. 14B. An energy management system can automatically coordinate different modules.

The advantage of using the semiconductor-based transfer switch modules in FIGS. 13A, 13B, 14A, and 14B is that the less complex and more cost-effective transfer switch 100 allow easy and user-based configurations.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description. Independent of the grammatical term usage, individuals with male, female or other gender identities are included within the term.

The invention claimed is:

1. A transfer switch that operates between a first power source and a second power source, wherein the second power source is a first DC power source, the transfer switch comprising:

a first circuit breaker connected to the first power source and a load, the first circuit breaker including a first circuit breaker handle that opens and closes the first circuit breaker, a second circuit breaker connected to the second power source and the load, the second circuit breaker including a second circuit breaker handle that opens and closes the second circuit breaker, wherein the second circuit breaker comprises a semiconductor-based DC circuit breaker, and an actuator configured to operate a second circuit breaker mechanical arm and a first circuit breaker mechanical arm that interact with the second circuit breaker handle and the first circuit breaker handle, respectively, such that the second circuit breaker and the first circuit breaker are mechanically interlocked, wherein the mechanical interlocking of the second circuit breaker and the first circuit breaker is configured such that only one circuit breaker of the second circuit breaker and the first circuit breaker is closed at any time, wherein the semiconductor-based DC circuit breaker comprises:

an air gap in series with two power MOSFET modules, wherein a source of one of the two power MOSFET modules is connected to a drain of the other of the two power MOSFET modules, wherein the two power MOSFET modules are connected in series; and an air gap actuator including a switching device configured to open the air gap, wherein the switching device is configured to be turned on for just long enough to open the air gap and then turned off.

2. The transfer switch of claim 1, wherein the first power source is an AC power source.

3. The transfer switch of claim 1, wherein the semiconductor-based DC circuit breaker further comprises:

a sensing and control circuit configured to control the semiconductor-based DC circuit breaker, wherein the two power MOSFET modules have a higher threshold voltage than a system voltage of the semiconductor-based DC circuit breaker.

4. The transfer switch of claim 1, wherein the first power source comprises utility power and the second power source comprises power from a renewable power source.

5. A method for switching between a first power source and a second power source using a transfer switch, the transfer switch comprising a first circuit breaker connected to the first power source, a second circuit breaker connected to the second power source, and an actuator connected to a first circuit breaker mechanical arm and a second circuit breaker mechanical arm, the first circuit breaker mechanical arm and the second circuit breaker mechanical arm being configured to interact with a first circuit breaker handle and a second circuit breaker handle, respectively, such that the first circuit breaker and the second circuit breaker are mechanically interlocked, the mechanical interlocking between the first circuit breaker and the second circuit breaker being configured such that only one circuit breaker of the first circuit breaker and the second circuit breaker is closed at any time, wherein the second circuit breaker comprises a semiconductor-based DC circuit breaker, the method comprising:

providing the transfer switch with the first circuit breaker closed and the second circuit breaker open;

opening the first circuit breaker, opening the first circuit breaker comprising rotating the actuator in a first rotational direction, such that:

the first circuit breaker mechanical arm moves the first circuit breaker handle of the first circuit breaker from an ON position to past an OFF overcenter position; and the second circuit breaker mechanical arm moves the second circuit breaker handle of the second circuit breaker below an ON overcenter position, which leaves open the second circuit breaker; and closing the second circuit breaker, closing the second circuit breaker comprising further rotating the actuator in the first rotational direction, such that the second circuit breaker mechanical arm moves the second circuit breaker handle to an ON position, wherein the semiconductor-based DC circuit breaker comprises:

an air gap in series with two power MOSFET modules, wherein a source of one of the two power MOSFET modules is connected to a drain of the other of the two power MOSFET modules, wherein the two power MOSFET modules are connected in series; and an air gap actuator including a switching device configured to open the air gap, wherein the switching device is configured to be turned on for just long enough to open the air gap and then turned off.

6. The method of claim 5, further comprising:

opening the second circuit breaker, opening the second circuit breaker comprising rotating the actuator in a second rotational direction opposite the first rotational direction, such that:

the second circuit breaker mechanical arm moves the second circuit breaker handle from the ON position to past an OFF overcenter position; and the first circuit breaker mechanical arm moves the first circuit breaker handle below an ON overcenter position, which leaves open the first circuit breaker; and closing the first circuit breaker, closing the first circuit breaker comprising further rotating the actuator in the second rotational direction, such that the first circuit breaker mechanical arm moves the first circuit breaker handle to an ON position.

7. The method of claim 6, wherein the first rotational direction is counterclockwise, and the second rotational direction is clockwise.

* * * * *